United States Patent
Abdul et al.

(10) Patent No.: US 8,006,135 B2
(45) Date of Patent: Aug. 23, 2011

(54) METHOD AND SYSTEM FOR REMOTE NODE DEBUGGING USING AN EMBEDDED NODE CONTROLLER

(75) Inventors: Anis M. Abdul, Austin, TX (US); Ajay Kumar Mahajan, Austin, TX (US); Rashmi Narasimhan, Round Rock, TX (US); Nicholas A. Pietraniec, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/353,287

(22) Filed: Jan. 14, 2009

(65) Prior Publication Data

US 2010/0180021 A1     Jul. 15, 2010

(51) Int. Cl.
*G06F 11/00* (2006.01)
(52) U.S. Cl. ............... 714/27; 714/4.1; 714/4.4; 714/46
(58) Field of Classification Search ............... 714/4, 10, 714/27, 26, 43, 46, 4.1, 4.11, 4.12, 4.2, 4.21, 714/4.3, 4.4, 4.5
See application file for complete search history.

(56) References Cited

U.S. PATENT DOCUMENTS

| | | | |
|---|---|---|---|
| 5,608,884 A * | 3/1997 | Potter .......................... 710/124 |
| 6,598,173 B1 * | 7/2003 | Sheikh et al. ..................... 714/4 |
| 7,047,495 B1 | 5/2006 | Pang | |
| 7,093,278 B1 | 8/2006 | Hooper | |
| 7,228,358 B1 | 6/2007 | McManus | |
| 7,290,180 B2 * | 10/2007 | Duron et al. .................... 714/43 |
| 2003/0028827 A1 * | 2/2003 | Gray ............................... 714/46 |
| 2004/0163008 A1 * | 8/2004 | Kim ................................... 714/4 |
| 2005/0102433 A1 | 5/2005 | Balasubramanian et al. |
| 2006/0031447 A1 | 2/2006 | Holt et al. | |
| 2006/0031723 A1 | 2/2006 | Blanchard et al. | |
| 2007/0038739 A1 | 2/2007 | Tucker | |
| 2008/0031165 A1 | 2/2008 | Shen et al. | |

OTHER PUBLICATIONS

Configuring Serial Console Redirection for the Intel ISP1100 Internet Server, Intel Corporation.
Ethernet Controller Node ECN320 with EMP, Ethernet DSL Access, May 2004, www.ericsson.com.

\* cited by examiner

*Primary Examiner* — Philip Guyton
*Assistant Examiner* — Joseph Kudirka
(74) *Attorney, Agent, or Firm* — Garg Law Firm, PLLC; Rakesh Garg; Libby Z. Toub

(57) ABSTRACT

A method, system and computer program product for remotely debugging a malfunctioning node controller of a node in a distributed node network through a functioning node controller of the same node. The method comprises establishing a serial link between the malfunctioning node controller and a functioning node controller and configuring the functioning node controller as a virtual console by the remotely-located central data processing system (DPS). The method further includes receiving, via an internal Fru Support Interface (FSI) link, serial data from the malfunctioning node controller through the virtual console, and debugging, by the DPS, a failure condition of the malfunctioning node controller, in response to receipt of the serial data through the virtual console.

20 Claims, 8 Drawing Sheets

METHOD AND SYSTEM FOR REMOTE NODE DEBUGGING USING AN EMBEDDED NODE CONTROLLER

BACKGROUND

1. Technical Field

The present invention generally relates to data processing system and in particular to a method and system for remote node debugging using an embedded node controller of a node with disk-less embedded node controllers.

2. Description of the Related Art

In a distributed computing network many nodes are linked together to provide a variety of services. If a node controller in the distributed network malfunctions, the malfunctioning node controller may not be accessible through an Ethernet port. Accordingly, tools available to a network operator to diagnose the cause of the node controller failure may not be useable, especially when there may be an Ethernet port failure. Diagnosing a malfunctioning node controller becomes more challenging for a disk-less embedded node controller.

One method of accessing a node controller to debug or diagnose node controller failures includes an Ethernet dongle. The Ethernet dongle is a hardware component configured to connect to a RS-232 port of a malfunctioning node controller. The Ethernet dongle is configured to allow data to be converted to Ethernet packets that can be accessed remotely. Another method for accessing a node controller includes use of an actual physical connection. A physical connection is created from a personal computer (PC) to the malfunctioning node controller. The PC is then capable of accessing the node controller to debug or diagnose the failure condition.

Both of the above methods require special hardware and hardware access to the malfunctioning node controller which can be costly as the number of nodes and node controllers increase.

SUMMARY OF ILLUSTRATIVE EMBODIMENTS

Disclosed are method, system and computer program product for remotely debugging a malfunctioning node controller in a distributed node network through an embedded functioning node controller of a node. The method comprises establishing a serial link between the malfunctioning node controller and the functioning node controller of the same node and configuring the functioning node controller as a virtual console. The method further includes receiving, via an internal FRU Support Interface (FSI) link, serial data from the malfunctioning node controller through the virtual console, and debugging, by the data processing system (DPS), a failure condition of the malfunctioning node controller, in response to receipt of the serial data through the virtual console.

The method further includes sequentially reading, by the malfunctioning node controller, console data from the virtual console and writing serial data, by the malfunctioning node controller, through the virtual console via the FSI link; and debugging a failure condition of the malfunctioning node controller by the DPS, in response to the serial data received through the virtual console and the serial link from the malfunctioning node controller.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
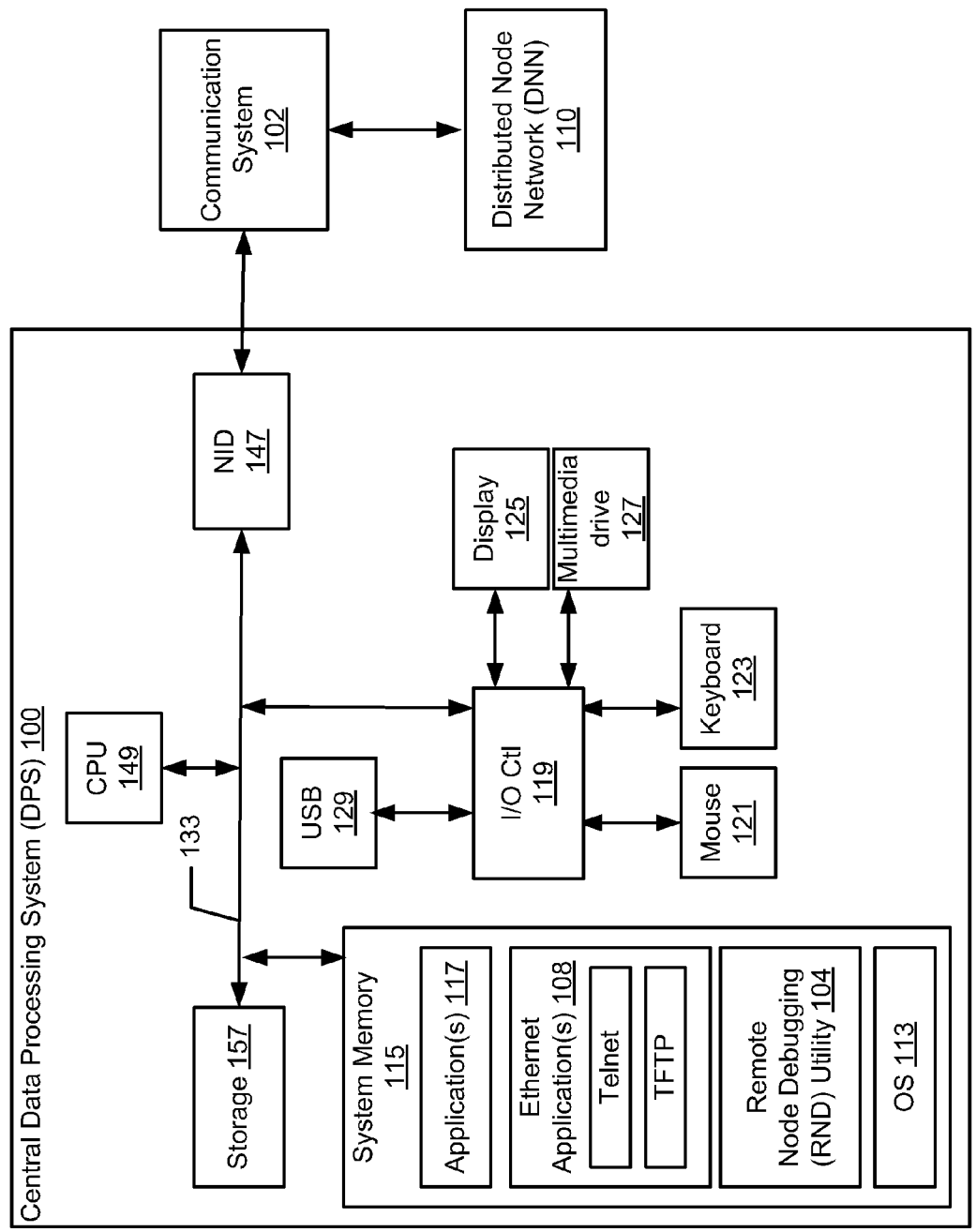
FIG. 1 is a block diagram of a central data processing system (and connected communication system) configured with hardware and software components for implementing one or more embodiments of the invention.

The illustrative embodiments provide a method, system and computer program product for remotely debugging a malfunctioning node controller (NC) of a node in a distributed node network (DNN) using a configurable functioning NC of the same node to access the malfunctioning NC. The functioning NC is an embedded NC adapted to be remotely configured as a virtual console to debug the malfunctioning NC through a FSI link.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1, there is a block diagram of a central data processing system (and connected mobile communication system) configured with hardware and software components. The central data processing system (DPS) 100 comprises at least one processor or central processing unit (CPU) 149 connected to system memory 115 via system interconnect/bus 133. System memory 115 is defined as a lowest level of volatile memory (not shown), including, but not limited to, cache memory, registers, and buffers. System memory 115 includes an Operating System (OS) 113, applications 117 and remote node debugging (RND) utility 104. System memory 115 further includes Ethernet Application(s) 108 for communicating with distributed node network (DNN) 110. Also connected to system bus 133 is I/O controller 119, which provides connectivity and control for input devices, of which pointing device (or mouse) 121 and keyboard 123 are illustrated, and output devices, of which display 125 is illustrated. Additionally, a multimedia drive 127 (e.g., CDRW or DVD drive) and USB (universal serial bus) hub 129 are illustrated, coupled to I/O controller 119. Multimedia drive 127 and USB hub 129 may operate as both input and output (storage) mechanisms. Central DPS 100 also comprises storage 157, within which data/instructions/code may be stored.

Central DPS 100 is also illustrated with network interface device (NID) 147 coupled to system bus 133. NID 147 enables DPS 100 to connect to one or more access networks, such as communication system 102. Communication system 102 may also connect to or be integrated with the Internet and/or other public communication networks and infrastructure to connect two or more user terminals for information exchange.

In the described embodiments, the Internet is a worldwide collection of networks and gateways that utilize the Transmission Control Protocol/Internet Protocol (TCP/IP) suite of protocols to communicate with one another. Of course, network access may also be provided via a number of different types of networks, such as an intranet, a wired or wireless local area network (LAN), a virtual private network (VPN), or other wired or wireless wide area network (WAN) other than the Internet, for example. Access may be compatible with cellular communications systems, satellite communications systems, or the like.

Ethernet Application(s) 108 includes TCP/IP protocols. For example, TCP/IP Transport Layer protocols enable communications between processes running on separate machines. Transport Layer Protocols at this level include at least Transmission Control Protocol (TCP) and User Datagram Protocol (UDP). The Application Layer of the Ethernet Application(s) 108 further includes Telnet and Trivial File Transfer Protocol (TFTP). TCP enables applications to talk to each other via virtual circuits. Depending on the network applications invoked, different Transport Layer protocols will be used. For example, if a Telnet protocol is invoked, the Ethernet Applications(s) 108 will employ TCP. However, when a Domain Name is requested, UDP is employed. The Telnet protocol enables terminals and terminal-oriented processes to communicate on a network running TCP/IP. Other TCP/IP protocols include File Transport Protocol (FTP) that transfers files to and from a remote network. TFTP enables users to transfer files to and from a remote machine. The TFTP provides a process for transferring files between two connected machines and for maintaining the connection between file transfers. For simplicity, only Telnet and TFTP are shown. Nonetheless, all Ethernet Layer Applications may be present.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. DPS 100 depicted in FIG. 1 may be, for example, an IBM eServer pSeries system, a product of International Business Machines Corporation in Armonk, N.Y., running the Advanced Interactive Executive (AIX) operating system or LINUX operating system. DNN 110 may be a High End way 64 machine.

Notably, in addition to the above described hardware components of DPS 100, various features of the invention are completed via the software (or firmware) code or logic stored within system memory 115 or other storage (e.g., storage 157) and executed by CPU 149. In one embodiment, data/instructions/code from storage 157 populates system memory 115, which is also coupled to system bus 133. Thus, illustrated within memory 115 and described above are a number of software/firmware components, including operating system (OS) 113 (e.g., Microsoft Windows®, a trademark of Microsoft Corp, or GNU®/Linux®, registered trademarks of the Free Software Foundation and The Linux Mark Institute, or Advanced Interactive eXecutive—AIX—, registered trademark of International Business Machines—IBM), applications 117, Ethernet application(s) 108 and RND utility 104.

In actual implementation, RND utility 104 may be combined with other software components (e.g., Ethernet application(s) 108) as a single application collectively providing the various functions of each individual software component when the corresponding code is executed by the CPU 149. For simplicity, RND utility 104 is illustrated and described as a stand alone or separate software/firmware component, which is stored in memory to provide/support the specific novel functions described herein.

The functionality of RND utility 104 will be described in greater details below. However, when executed by microprocessor, key functions provided by RND utility 104 include remote virtual console configuration of a functioning node controller, serial data capturing, and debugging.

Figure 2:
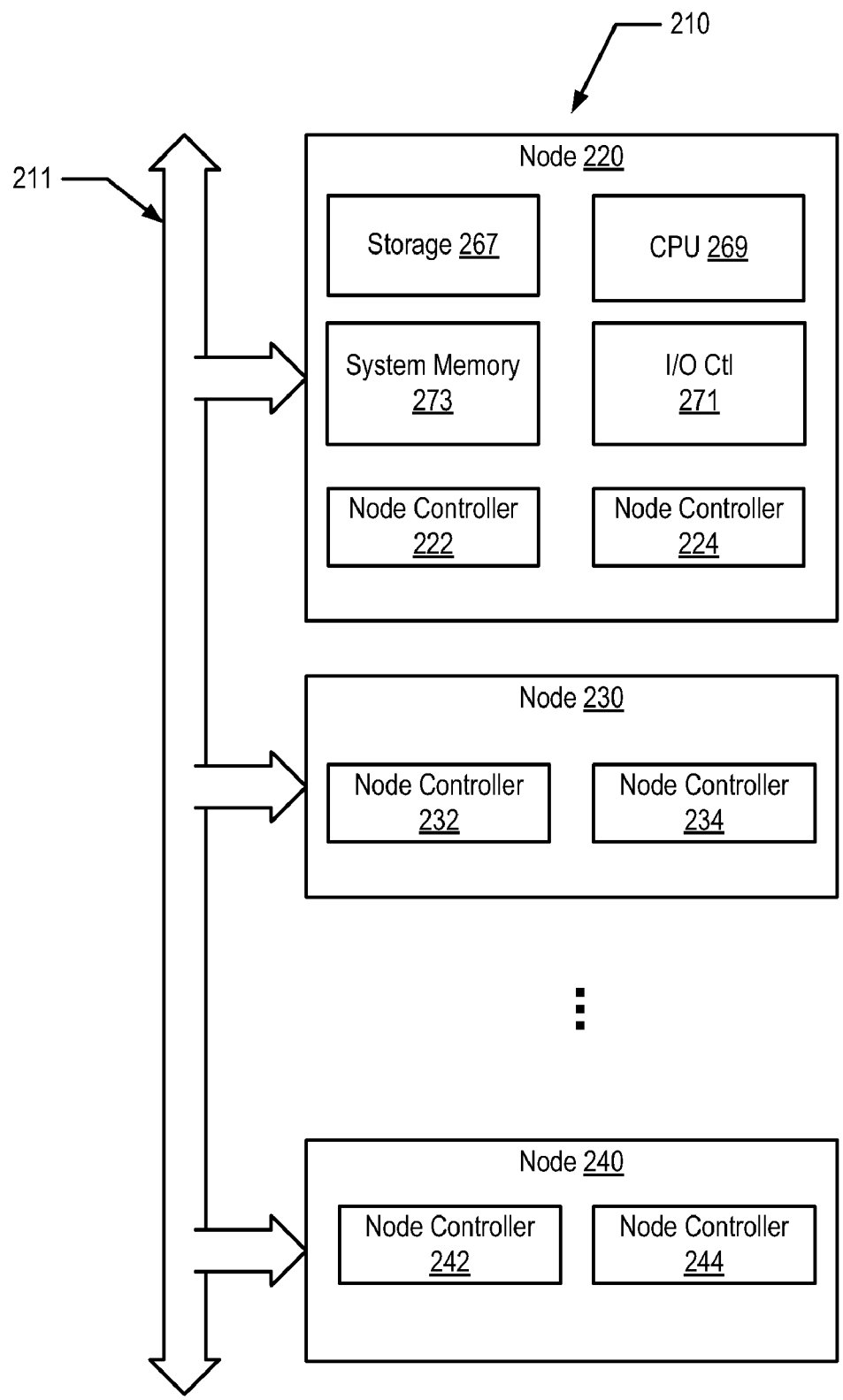
FIG. 2 is a block diagram of a distributed node network, in accordance with one embodiment of the invention.

With reference now to FIG. 2 there is shown a block diagram of a distributed node network (DNN) 210, in accordance with one embodiment of the invention. DNN 210 includes a plurality of nodes 220, 230, . . . , 240. Node 220 includes a plurality of embedded node controllers (NC) 222 and 224. Node 230 includes a plurality of embedded node controllers (NC) 232 and 234. Node 240 includes a plurality of embedded node controllers (NC) 242 and 244. In one embodiment, there are eight (8) nodes and sixteen (16) node controllers (NC) where each node has a pair of NCs. Nonetheless, other configurations may be employed. Each node 220, 230, . . . , 240 is connected to all other nodes via serial bus 211.

Since each node may be essentially similar, only node 220 will be described in detail. Node 220 further includes one or more central processing units (CPU) 269, local disk storage 267, and I/O controller 271. Node 220 also includes system memory 273. Node 220 also includes various applications, an Operating System and Ethernet Application(s), such as described above in relation to DPS 100 (FIG. 1). DPS 100 boots, debugs and performs file transfer operations and system control functions with the plurality of nodes 220, 230, . . . , 240 and the NCs, as will be described in more detail below.

Those of ordinary skill in the art will appreciate that DNN 210 depicted in FIG. 2 is a basic illustration, and thus the hardware utilized in actual implementation may vary. Thus, the depicted example is not meant to imply architectural limitations with respect to the present invention.

Figure 3:
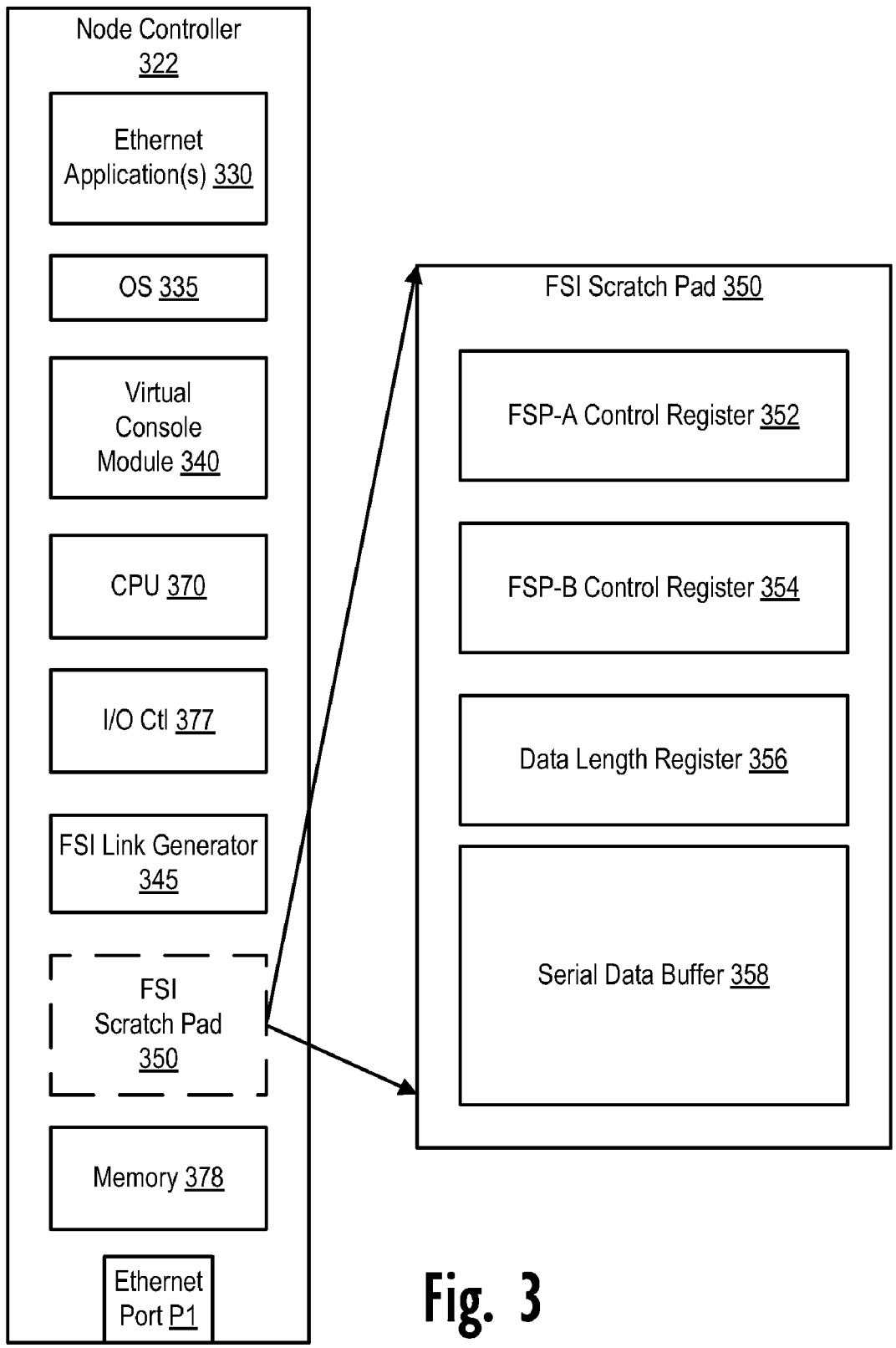
FIG. 3 is a block diagram of a node controller of FIG. 2, in accordance with one embodiment of the invention.

FIG. 3 is a block diagram of a node controller (NC) of FIG. 2, in accordance with one embodiment of the invention. Node controller (NC) 322 includes Ethernet Application(s) 330 and Operating System (OS) 335. Ethernet Application(s) 330 allows NC 322 to communicate with DPS 100 (FIG. 1). NC 322 further includes Virtual Console Module 340, FSI link generator 345 and FSI scratch pad 350. NC 322 is further configured to include Ethernet port P1. The operations of FSI link generator 345 and FSI scratch pad 350 are described in more detail below.

NC 322 is a separate and complete embedded computer. NC 322 contains a dedicated CPU 370, I/O controller 377, memory 378, etc. The OS 335 may be a Linux® operating system or another operating system. NC 322 has access to CPU 269 and/or other node components associated with the node of which NC 322 is embedded. A node's NC is responsible for initializing and configuring the node's component.

FSI link generator 345 is configured to automatically establish a FSI link between two NCs of the same node, such as when power is delivered to the node or NCs. FSI scratch pad 350 includes a plurality of registers and one or more serial data buffers 358 for writing a plurality of bytes of data to debug a malfunctioning NC. In one configuration, FSI scratch pad 350 allows data to be written in the registers and buffer 358. For example, the FSI scratch pad 350 may allow 48 bytes of data to be written. An FSI link is used for internal FSP-to-FSP communications such as between NCs of a node. The FSI link uses a FSP interface (FSPI) protocol for transferring data over the FSI link.

The plurality of registers includes at least Flexible Service Processor (FSP)-A control register 352 and data length register 356. FSP-A control register 352 has capacity to store two-bytes of control data, the FSP-A control data indicates whether data is valid in data length register 356 and serial data buffer 358. Data length register 356 stores control data representative of a length of the data in serial data buffer 358. FSI scratch pad 350 further includes FSP-B control register 354, the FSP-B control register 354 has capacity to read a plurality of bytes of serial data used to debug the malfunctioning NC. FSI scratch pad 350 is configured to allow data to be read and written sequentially. FSI scratch pad 350 is further configured to allow commands and results to flow from DPS 100 (FIG. 1) to the firmware running on a malfunctioning NC. A user may initiate a debugging operation at DPS 100. FSI scratch pad 350 serves as a tool that may be accessed by the user through DPS 100 to remotely debug and gather First Failure Data capture of failing or malfunctioning NCs without additional hardware. NC 322 is further configured to include hardware lines to configure all serial console data to be routed to a properly functioning NC. The console data is generally the data written when a FSP boot operation is performed.

The control data also includes a flag which is part of the control register data. The flag is described later in relation to FIG. 6.

Data length register 356 and serial data buffer 358 are used by the malfunctioning and functioning NCs to transfer data therebetween. FSP-A control register 352 is used at the functioning NC to indicate that the data is valid in data length register 356 and serial data buffer 358. FSP-B control register 354 is used at the malfunctioning NC to indicate that the data is valid in data length register 356 and serial data buffer 358.

These control registers are monitored by the malfunctioning and functioning NCs. For example, the functioning NC will monitor FSP-B control register 354 at the malfunctioning NC while the malfunctioning NC will monitor FSP-A control register 352 at the functioning NC to co-ordinate data transfer. In one embodiment, the malfunctioning NC is incapable of communicating from an Ethernet port. If the Ethernet link from the Ethernet port of a NC is broken or malfunctioning, a means for collecting failure data is needed. The operations described herein collect the failure data needed to bring the malfunctioning NC back into communication from the Ethernet port. Thus, the NC's CPU and OS are considered operational although the NC is experiencing an Ethernet port failure.

Figure 4:
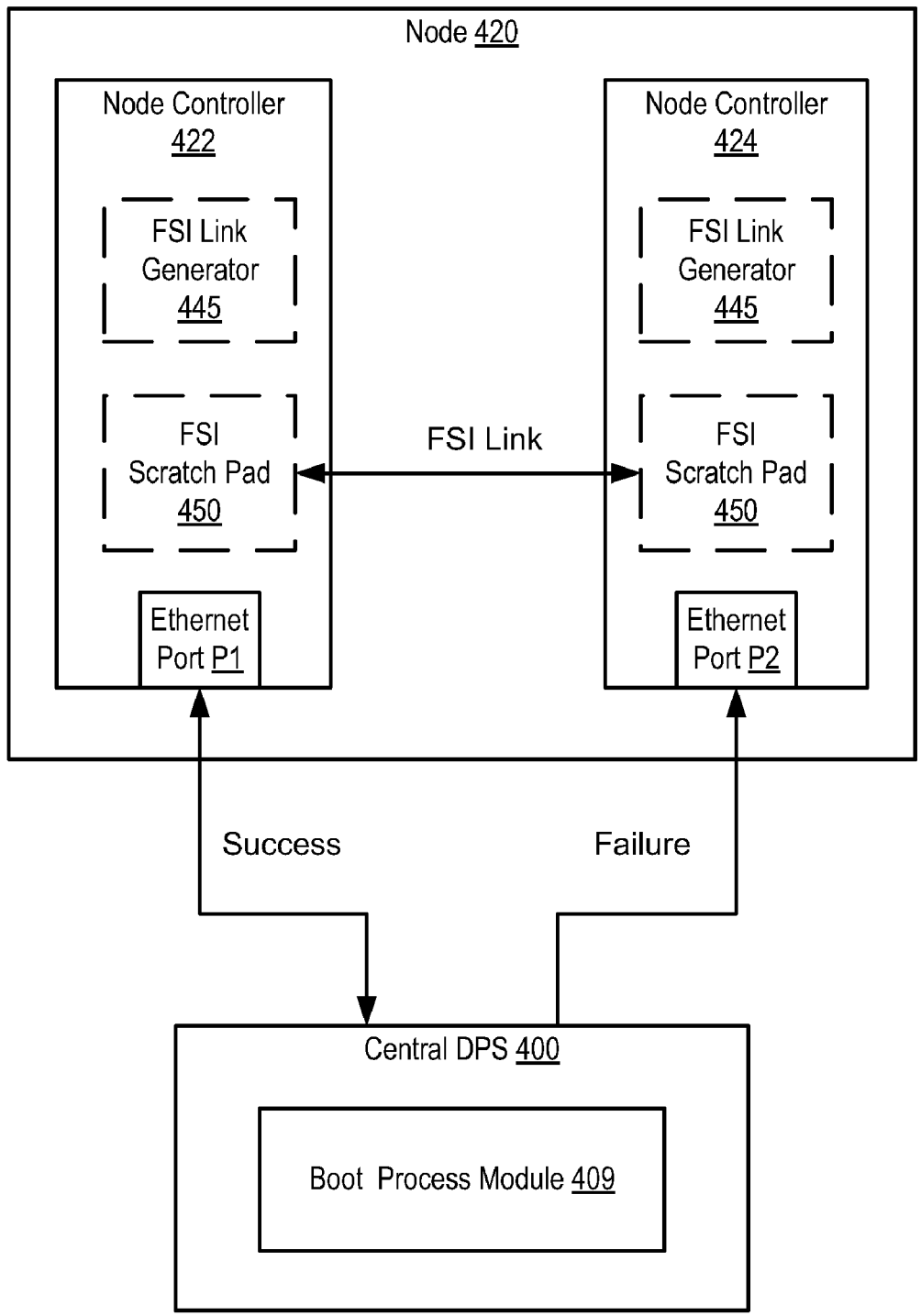
FIG. 4 is a block diagram of a central data processing system coupled to a node of the distributed node network for carrying out a boot process operation, in accordance with one embodiment of the invention.

FIG. 4 is a block diagram of a central DPS 400 coupled to node 420 for carrying out a boot process operation, in accordance with one embodiment of the invention. NCs 422 and 424 have access to DPS 400 via boot process module 409. Node 420 is shown to include NCs 422 and 424. NCs 422 and 424 are shown to include Ethernet Ports P1 and P2, respectively. In one embodiment, the NCs boot operation is performed as soon as the node is powered.

NCs 422 and 424 boot automatically when the system power is applied. The NCs 422 and 424 boot up and retrieve their boot image using the TFTP running on DPS 400 via boot process module 409. In general, there are no consoles available for individual nodes or the NCs because of packaging concerns. DPS 400 is configured to access each NC 422 and 424 by using the Telnet protocol running on DPS 400. In order to start or initiate boot operations, power is delivered to the nodes. Boot processes are well established in the art and will not be described further. In operation, when node 420 is powered and successfully completes the boot process, NCs 422 and 424 will establish a FSI link therebetween, via FSI link generator 445. The FSI link connects together the FSI scratch pads 450 of NCs 422 and 424. The configuration of the FSI link is performed very early in the boot process. If the establishment of the FSI link fails, then the related NC will be considered dead and would require replacement. The operations described herein assume that the NC is functional but the Ethernet link is either broken or malfunctioning.

In the depicted example of FIG. 4, the boot process of NC 422 of node 420 was successful and the communication path between NC 422 of node 420 and DPS 400 is shown as a two-way path. However, NC 424 did not boot properly. Thus, the communication path between DPS 400 is shown as a one way path to indicate a boot failure. In the illustration, NC 424 is a malfunctioning node controller. For example, a lack of an expected response in accordance with TCP/IP would indicate a failure. In the event that a NC is failing the boot process, there may not be a path to NC 424 to debug and collect the First Failure Data in order to diagnose and debug the failure condition in NC 424. Possible reasons for NC failure include hardware failure (e.g. Ethernet port failure) or firmware issues (e.g. dynamic Host Configuration Protocol (DHCP) negotiation failure). The list of reasons is not exhaustive.

Figure 5:
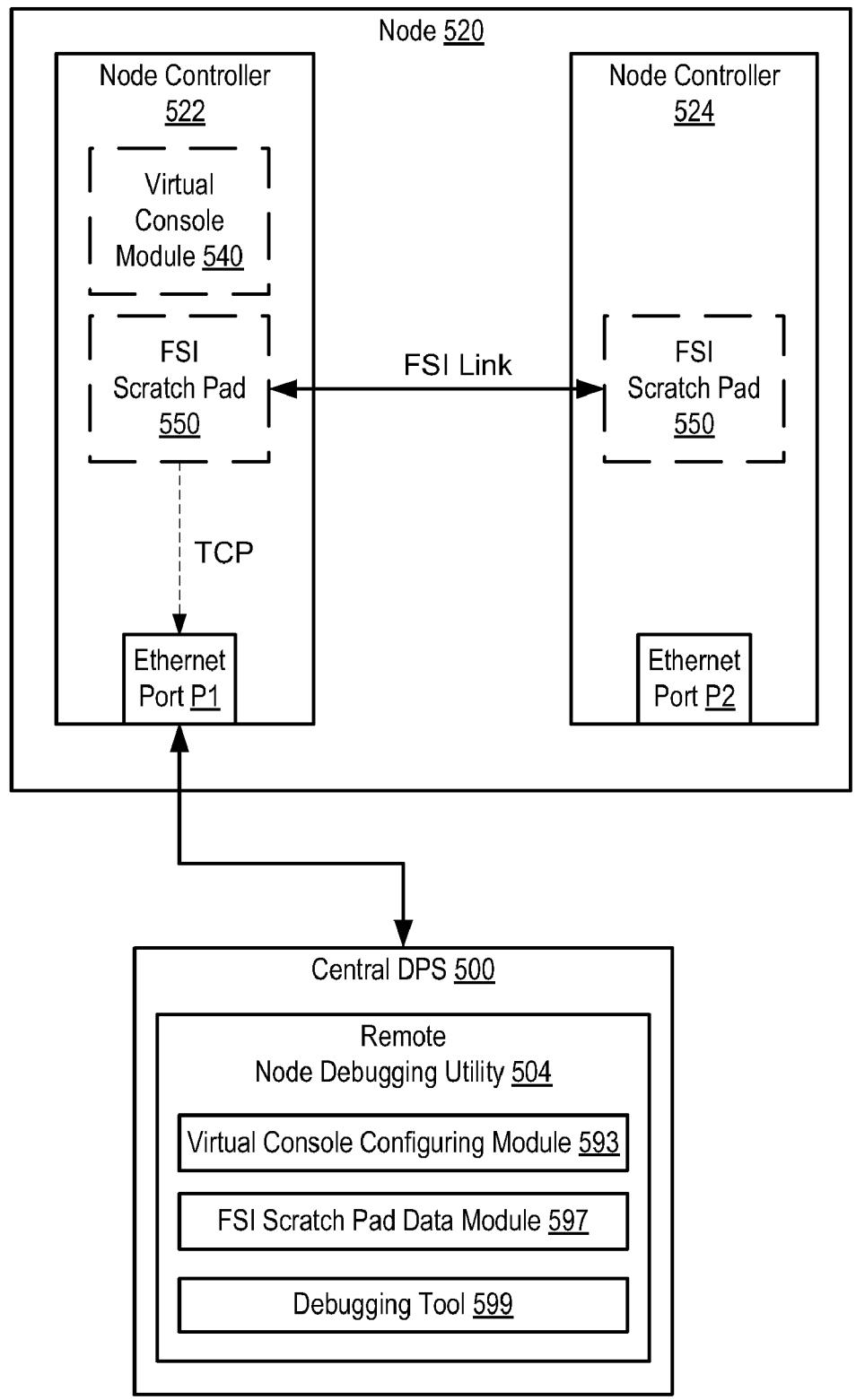
FIG. 5 is a block diagram of a remote debugging configuration of a central data processing system, in accordance with one embodiment of the invention.

FIG. 5 is a block diagram of a remote debugging configuration of a central DPS 500, in accordance with one embodiment of the invention. Node 520 includes NCs 522 and 524. NCs 522 and 524 are shown to include Ethernet Ports P1 and P2, respectively. When DPS 500 determines that one of the node controllers is malfunctioning, RND utility 504 is employed to debug the malfunctioning NC. In the example, the malfunctioning NC is NC 524. While NC 524 includes an Ethernet Port P2, access to such Ethernet Port P2 is assumed to be inaccessible. NC 522 is shown with virtual console module 540 and FSI scratch pad 550 deployed. NC 524 in shown with FSI scratch pad 550 deployed.

RND utility 504 includes virtual console configuring (VCC) module 593, FSI scratch pad data module 597 and debugging tool 599. Thus, DPS 500 accesses malfunctioning NC 524 through the FSI link via an Ethernet port P1 of NC 522 of node 520. VCC module 593 allows DPS 500 to configure NC 522 to function as a virtual console via virtual console module 540. FSI scratch pad data module 597 is configured to respectively send console data to and from FSI scratch pad 550 of malfunctioning NC 524 via the VCC module 593. Debugging tool 599 may include an application and user interfaces (UI) for accessing and diagnosing or debugging the serial data retrieved from malfunctioning NC 524.

The operations described herein rely on the following properties of a NC to boot during the boot operation. First, each of the NCs 522 and 524 of node 520 contains built-in instructions (software instructions) to perform a boot process to a point where each NC can receive boot load instruction using a TFTP protocol. Since the TFTP protocol depends on a healthy (operational) Ethernet connection in order for a NC to receive code (instructions) from the DSP 500, a failure in either connection will result in the associated NC waiting for an infinite amount of time.

When a NC 522 or 524 boots up and waits for a boot load transfer, if a NC fails after a predetermined amount of time, in one embodiment, the NC checks its own control register data in a periodic basis (assuming FSP-B control register is part of the NC that is malfunctioning, the NC should look at FSP-B control register 354). In this example, NC 524 is a malfunctioning NC.

DPS 500 can be configured by the operator to use the NC 522 associated with the FSP-A control register of its own FSI scratch pad 550 to configure the FSP-B control register of the FSI scratch pad 550 of malfunctioning NC 524 with a command (which is being monitored by the FSP-B control register) to begin redirecting the FSP-B control register's console data. As a result, console data in the FSP-B control register of NC 524 is written in serial data buffer 358 and data length register 356 is updated with the corresponding written length. Additionally, the data of the FSP-B control register of NC 524 will be used to update the FSP-A control register of NC 522 to indicate that the data in serial data buffer 358 and data length register 356 is valid.

The NC 522 monitoring the FSP-A control register of its own FSI scratch pad 550 will now read the data in serial data buffer 358 and send it to the DPS 500. Furthermore, the DPS 500 can request data other than the console data to be retrieved from malfunctioning NC 524. For example, the FSP-B control register of malfunctioning NC 524 can be configured with a command to retrieve contents of a specific register.

Figure 6:
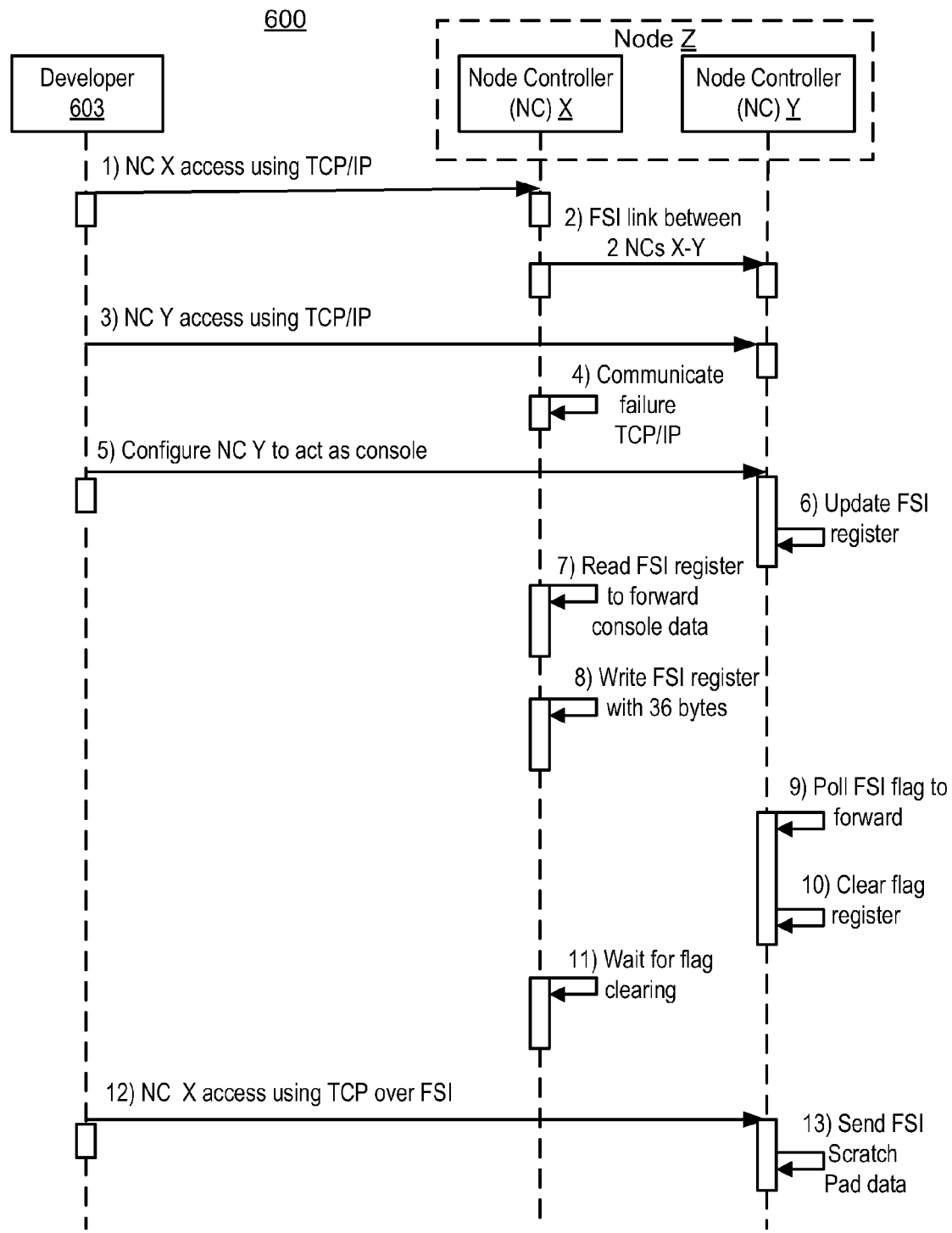
FIG. 6 is a process diagram of the process by which the features of the invention are implemented, according to one or more embodiments of the invention.

FIG. 6 is a process diagram of the process 600 by which the features of the invention are implemented, according to one embodiment of the invention. Process 600 will also be described in relation to FIG. 5. DSP 500 would include a user interface to provide selection options for the developer 603 to select a particular node and a corresponding NC. The functioning NC would be visible through the user interface. Process 600 begins sequence element 1 where a developer (user) 603 accesses node controller (NC) X of node Z, using TCP/IP running on DPS 500. At sequence element 2, NC X automatically establishes FSI links with at least the other NC Y in node Z, as shown in FIG. 4. The FSI links may be established when power is delivered to the nodes. For example, NC X establishes a FSI link with NC Y. Developer 603 will also need to access NC Y via TCP/IP running on DPS 500 at sequence element 3. The creation of an FSI link was previously established between NCs X and Y. During the boot operation of NC X or at other times, a communication failure may be experienced according to TCP/IP at sequence element 4. Once the boot process of NC Y is complete or when necessary, a user or developer 603 can then configure the functioning NC Y as a virtual console.

NC X serves as malfunctioning NC 524 and NC Y serves as functioning NC 522. NC Y (NC 522) is configured as a virtual console. For example, VCC module 593 in DPS 500 allows the developer 603 to configure functioning NC Y (NC 522) to function as a virtual console via virtual console module 540 at sequence element 5. After, the NC Y (NC 522) is configured as a virtual console, DPS 500 is used by the user or developer 603 to update the registers in FSI scratch pad 550 with console data at sequence element 6.

Through the FSI link, malfunctioning NC X (NC 524) reads updated console data via NC Y (NC 522) to determine which information is requested at sequence element 7. The requested information would be at least in part indicative of the failure condition. FSI scratch pad 550 in NC X then writes the serial data in the serial data buffer (e.g. serial data buffer 358) representative of a malfunction for diagnosing the failure condition of NC X at sequence element 8. For example, 36 bytes may be written in the serial data buffer. The other registers such as data length register 356 and FSP-A control register 352 are written with other control data as previously described. During the FSI scratch pad writing operation by NC Y polls a flag in FSI scratch pad 550 of NC X until the flag (control register 352) is set indicative of completion of the writing operation at sequence element 9. Once the flag is set, NC Y will read the data and then clear its flag register (control register 352) at sequence element 10. NC X will wait for the flag (control register 352) to be cleared at sequence element 11. Thereafter, developer 603 is capable of accessing NC X using TCP at sequence element 12 over the FSI link to receive the serial data from FSI scratch pad 550 in NC X through NC Y at sequence element 13.

Process 600 is initiated by a user or developer 603 and utilizes interaction by the user or developer 603 (e.g., to select a particular node controller for configuration). However, one or more of the functions initiated by the user or developer 603 and/or the interaction may be automated. The process 600 will repeat a loop of sequence elements 5-13 in FIG. 6. The developer 603 can configure the control registers of the FSI scratch pad for various data collection tasks. For example, in the case of retrieving the console data, the FSI scratch pad will be configured repeatedly to retrieve the necessary console data. If developer 603 chooses to perform other data collection tasks, then the FSI scratch pad can be reprogrammed with appropriate commands.

Figure 7A:
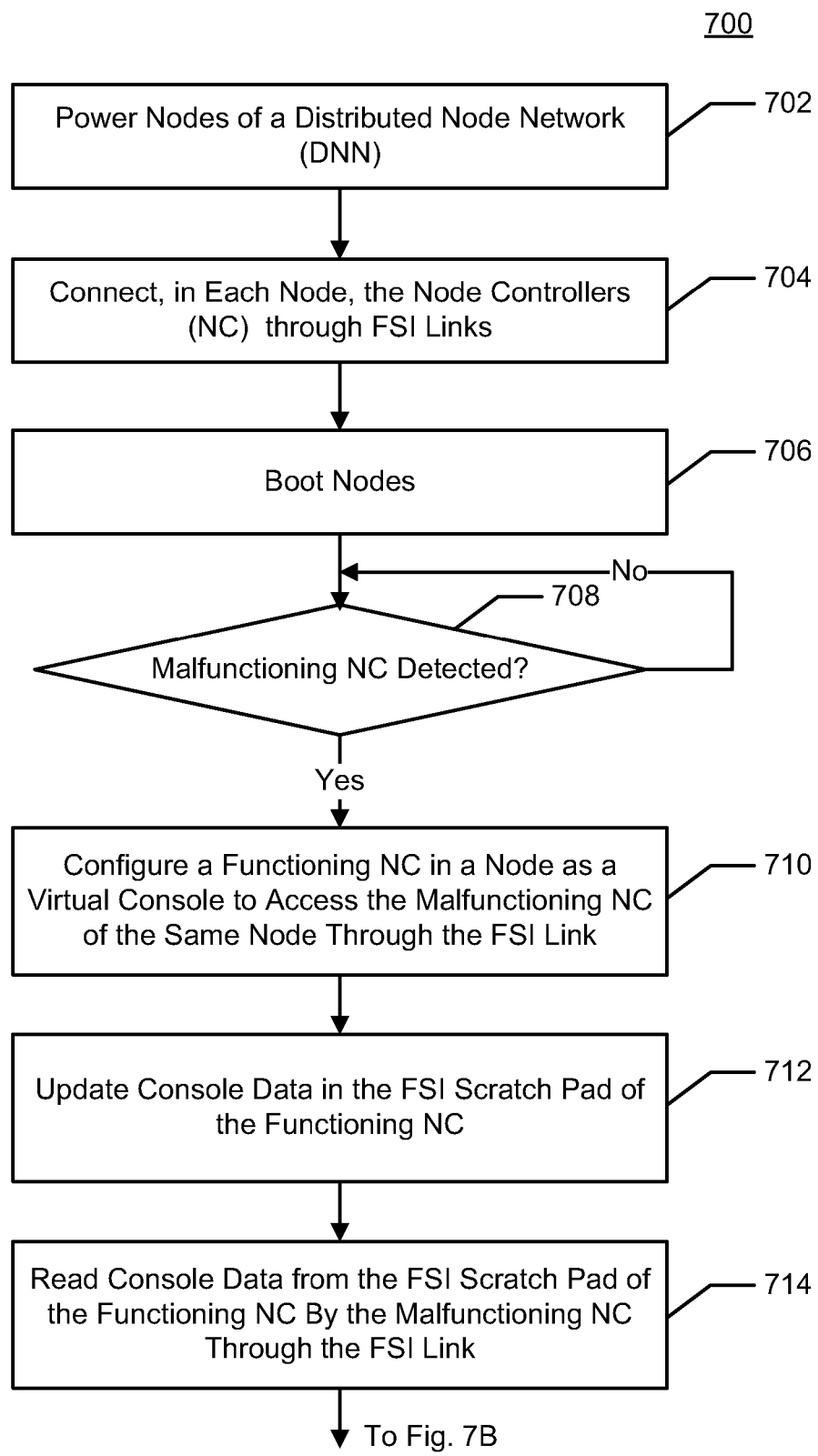
FIGS. 7A and 7B are a flowchart of a debugging process by which features of the invention are implemented, according to one or more embodiments of the invention.
Figure 7B:
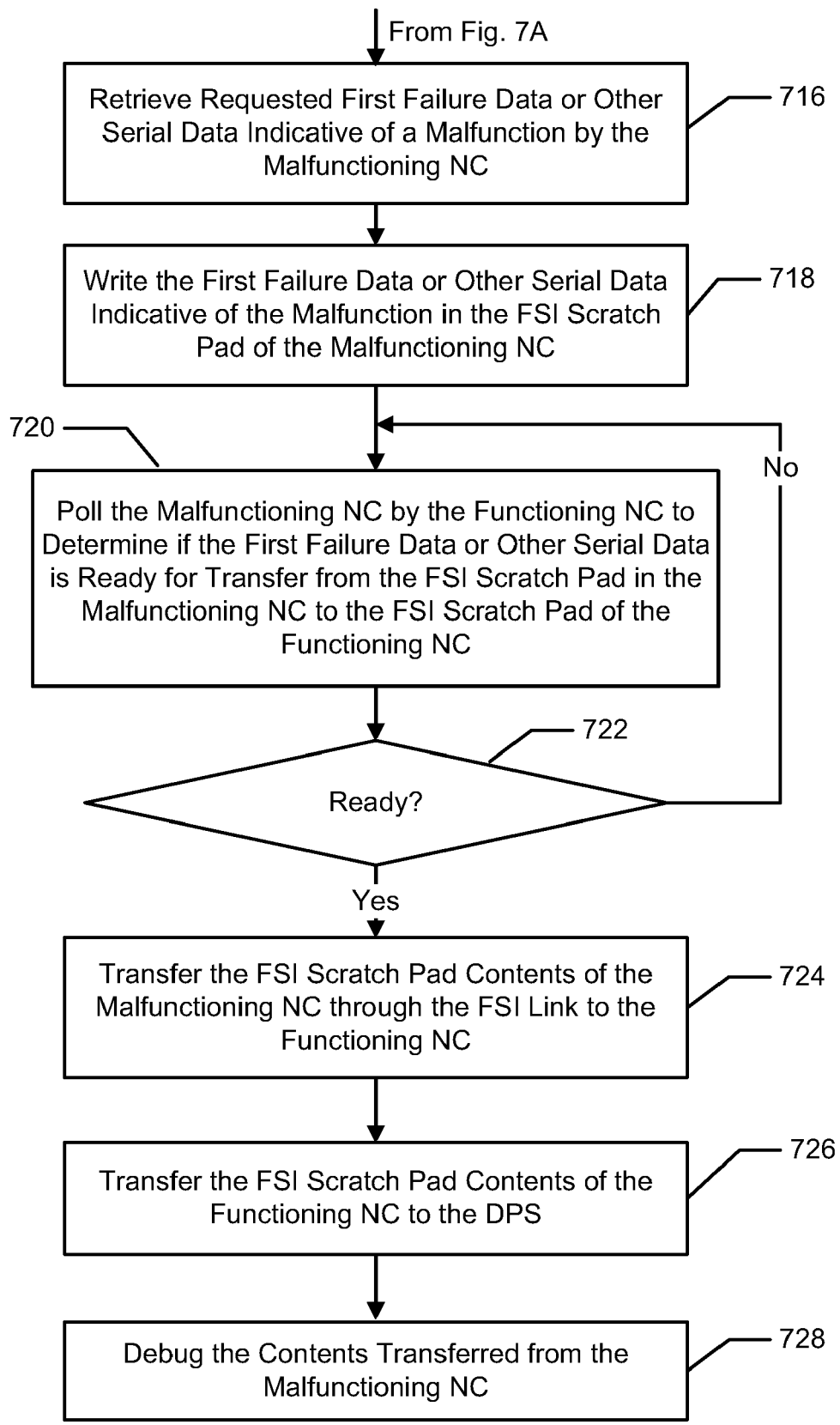

FIGS. 7A and 7B are a flowchart of a debugging process 700 by which features of the invention are implemented, according to one or more embodiments of the invention. Process 700 begins with the powering of the nodes and embedded node controllers (NCs) in the distributed node network (DNN) at block 702. Upon powering the nodes, each NC connects to the other NCs of the same node in the DNN through a FSI link at block 704. There is a FSI link between any two NCs. Thus, any NC would have a dedicated FSI link between itself and each additional NCs in the node. Once power is delivered to the nodes, the user or developer may initiate a boot process to boot the nodes and NCs, at block 706. Nonetheless, the start of the boot process may be automated instead of being initiated by the user or developer.

At block 708, the DPS detects a malfunction or failure of at least one of the NCs in a node. The DPS may detect a malfunction or failure in response to detecting whether a particular NC did not boot during the boot process. However, communication failures, Ethernet port failures or other failures may be detected at other times and are not limited to failures that occur during a boot process. At block 710, the user or developer using the DPS selects and configures a functioning NC of a node as a virtual console to access the malfunctioning NC, of the same node, through a FSI link. The FSI link was established, such as when the nodes and NCs are powered on. At block 712, during the configuration of the virtual console, console data is updated in or written to the FSI Scratch Pad of the functioning NC. At block 714, the malfunctioning NC reads the console data from the FSI Scratch Pad of the functioning NC through the FSI link. At block 716, the malfunctioning NC retrieves requested First Failure Data or other serial data indicative of a malfunction. At block 718, the malfunctioning NC writes the First Failure Data or other serial data indicative of a malfunction in the FSI Scratch Pad, in response to the console data.

At block 720, the malfunctioning NC is polled by the functioning NC to determine if the First Failure Data or other serial data is ready for transfer from the FSI Scratch Pad in the malfunctioning NC to the FSI Scratch Pad of the functioning NC. At block 722, a determination is made whether the data from the malfunctioning NC is ready to be transferred. For example, a polling flag is set when the data is ready for transfer. At block 724, the FSI Scratch Pad contents of the malfunctioning NC are transferred through the FSI link to the functioning NC when the malfunctioning NC is ready. At block 726, the FSI Scratch Pad contents of the functioning NC are transferred to or accessed by the DPS. At block 728, the contents transferred from the malfunctioning NC to the DPS are debugged.

In the process diagram and flowchart above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for remotely debugging a malfunctioning node controller (NC) of a node in a distributed node network, the method comprising:
    establishing a serial link between the malfunctioning NC and a functioning NC, wherein the malfunctioning NC and the functioning NC are both node controllers in the node, and wherein the malfunctioning NC and the functioning NC each include a FRU Support Interface (FSI) scratch pad, and each FSI scratch pad includes a serial data buffer where data is stored and a data length register where a length of data in the serial data buffer is stored;
    configuring the functioning NC as a virtual console;
    receiving, via the serial link, serial data of the malfunctioning NC through the virtual console; and
    debugging a failure condition of the malfunctioning NC, in response to receipt of the serial data.

2. The method according to claim 1, wherein the establishing of the serial link comprises:
    automatically establishing a FSI link between the malfunctioning NC and the functioning NC, and wherein the malfunctioning NC and the functioning NC each include built-in instructions to perform a boot process to a point where the malfunctioning NC and the functioning NC each can receive boot load instruction.

3. The method according to claim 2, further comprising:
    receiving console data in the FSI scratch pad of the functioning NC from a remotely-located central data processing system (DPS);

sending, from the FSI scratch pad of the functioning NC, data indicative of a request for information associated with the failure condition through the FSI link to the malfunctioning NC; and communicating, via a hardware port in the functioning NC, the received serial data of the malfunctioning NC to the DPS, the received serial data being in response to the request for information.

4. The method according to claim 3, further comprising:
writing the serial data in the serial data buffer of the FSI scratch pad in the malfunctioning NC;
writing control data to a Flexible Service Processor (FSP) control register of a FSI scratch pad in the malfunctioning NC, the control data being associated with the serial data; and
writing a length of data parameter indicative of a length of the serial data in the data length register of the FSI scratch pad in the malfunctioning NC.

5. The method according to claim 3, further comprising:
writing the console data in the serial data buffer of the FSI scratch pad in the functioning NC;
writing control data, associated with the console data, to a FSP control register of the FSI scratch pad in the functioning NC; and
writing a length of data parameter indicative of a length of the console data in the data length register of the FSI scratch pad in the functioning NC.

6. The method according to claim 3, further comprising:
writing the received serial data in the serial data buffer of the FSI scratch pad in the functioning NC;
writing control data associated with the received serial data to a FSP control register of the FSI scratch pad in the functioning NC; and
writing a length of data parameter indicative of a length of the received serial data in the data length register of the FSI scratch pad in the functioning NC.

7. The method according to claim 1, further comprising:
accessing one of the functioning NC and the malfunctioning NC via a Transmission Control Protocol/Internet Protocol (TCP/IP) running on a remotely-located central data processing system (DPS);
determining a TCP/IP communication failure associated with the malfunctioning NC;
configuring the functioning NC as the virtual console to access the malfunctioning NC in response to the TCP/IP communication failure associated with the malfunctioning NC; and
receiving, by the DPS, the serial data associated with the failure condition of the malfunctioning NC from the functioning NC to debug the failure condition.

8. The method according to claim 1, further comprising:
booting, by a remotely-located central data processing system (DPS), the functioning NC;
booting, by the DPS, the malfunctioning NC;
determining, by the DPS, a Transmission Control Protocol/Internet Protocol (TCP/IP) communication failure with the malfunctioning NC, in response to the booting of the malfunctioning NC; and
configuring the functioning NC as the virtual console in response to determining the communication failure.

9. A central data processing system (DPS) for remotely debugging a malfunctioning node controller (NC) of a node in a distributed node network via a functioning NC having a serial link between the malfunctioning NC and the functioning NC, the DPS comprising:

at least one processor having a set of instructions stored in memory, which when executed, cause the at least one processor to:
configure the functioning NC as a virtual console, wherein the malfunctioning NC and the functioning NC are both node controllers in the node, and wherein the malfunctioning NC and the functioning NC each include a FRU Support Interface (FSI) scratch pad, and each FSI scratch pad includes a serial data buffer where data is stored and a data length register where a length of data in the serial data buffer is stored;
write console data via the virtual console for the malfunctioning NC;
access, via the serial link, serial data from the malfunctioning NC through the functioning NC, the serial data being indicative of a failure condition; and
debug the failure condition of the malfunctioning NC, in response to the serial data accessed through the functioning NC and the serial link to the malfunctioning NC.

10. The DPS according to claim 9, wherein the serial link is a FSI link, and the set of instructions when executed, further cause the at least one processor to:
access the serial data via the FSI link between the malfunctioning NC and the functioning NC, and wherein the malfunctioning NC and the functioning NC each include built-in instructions to perform a boot process to a point where the malfunctioning NC and the functioning NC each can receive boot load instruction.

11. The DPS according to claim 10, wherein the set of instructions when executed, further cause the at least one processor to:
write the console data in the FSI scratch pad of the functioning NC; and
access the serial data indicative of the failure condition in the FSI scratch pad of the malfunctioning NC through the FSI link and a hardware port in the functioning NC using a Transmission Control Protocol (TCP).

12. The DPS according to claim 11, wherein the set of instructions when executed, further cause the at least one processor to:
access control data of a Flexible Service Processor (FSP) control register of the FSI scratch pad associated with the malfunctioning NC;
access a length of data parameter indicative of a length of the serial data from the FSI scratch pad associated with the malfunctioning NC; and
access the serial data in the serial data buffer in the FSI scratch pad associated with the malfunctioning NC.

13. The DPS according to claim 10, wherein the set of instructions when executed, further cause the at least one processor to:
access one of the functioning NC and the malfunctioning NC via a Transmission Control Protocol/Internet Protocol (TCP/IP) running on the DPS; and
determine a TCP/IP communication failure in the malfunctioning NC wherein the instructions to configure the functioning NC as the virtual console are executed in response to determining an occurrence of the TCP/IP communication failure.

14. The DPS according to claim 13, wherein the set of instructions when executed, further cause the at least one processor to:
boot the functioning NC;
boot the malfunctioning NC;

determine the TCP/IP communication failure with the malfunctioning NC, in response to the booting of the malfunctioning NC; and configure the functioning NC as the virtual console in response to determining the communication failure.

15. A computer usable program product including a computer readable recordable medium having a set of instructions executable by at least one processor to:

configure a functioning node controller (NC) as a virtual console;

write console data via the virtual console for use by a malfunctioning NC, wherein the malfunctioning NC and the functioning NC are both node controllers in a node, and wherein the malfunctioning NC and the functioning NC each include a FRU Support Interface (FSI) scratch pad, and each FSI scratch pad includes a serial data buffer where data is stored and a data length register where a length of data in the serial data buffer is stored;

access, via the serial link, serial data from the malfunctioning NC through the functioning NC, the serial data being indicative of a failure condition; and debug the failure condition of the malfunctioning NC, in response to the serial data accessed through the functioning NC and the serial link to the malfunctioning NC.

16. The computer usable program product according to claim 15, wherein the serial link is a FSI link, and further comprising a set of instructions executable by the at least one processor to:

access the serial data via the FSI link between the malfunctioning NC and the functioning NC, and wherein the malfunctioning NC and the functioning NC each include built-in instructions to perform a boot process to a point where the malfunctioning NC and the functioning NC each can receive boot load instruction.

17. The computer usable program product according to claim 16, further comprising a set of instructions executable by the at least one processor to:

transfer, via the FSI link, the console data from a FSI scratch pad in the functioning NC to the malfunctioning NC; and access, via the FSI link, the serial data indicative of the failure condition in a FSI scratch pad of the malfunctioning NC using a Transmission Control Protocol (TCP) and a hardware port in the functioning NC.

18. The computer usable program product according to claim 17, further comprising a set of instructions executable by the at least one processor to:

access control data of a FSP control register in the FSI scratch pad associated with the malfunctioning NC;

access a length of data parameter indicative of a length of the serial data of the FSI scratch pad associated with the malfunctioning NC; and access the serial data in the serial data buffer of the FSI scratch pad associated with the malfunctioning NC.

19. The computer usable program product according to claim 15, further comprising a set of instructions executable by the at least one processor to:

access one of the functioning NC and the malfunctioning NC via a Transmission Control Protocol/Internet Protocol (TCP/IP) application; and determine a TCP/IP communication failure with the malfunctioning NC wherein the instructions to configure the functioning NC as the virtual console are executed in response to determining an occurrence of the TCP/IP communication failure.

20. The computer usable program product according to claim 15, wherein the set of instructions when executed, further cause the at least one processor to:

boot the functioning NC;

boot the malfunctioning NC;

determine a Transmission Control Protocol/Internet Protocol (TCP/IP) communication failure with the malfunctioning NC, in response to the booting of the malfunctioning NC; and configure the functioning NC as the virtual console in response to determining the communication failure.

* * * * *